(12) United States Patent
You et al.

(10) Patent No.: US 8,898,696 B2
(45) Date of Patent: Nov. 25, 2014

(54) SYSTEM AND METHOD FOR ALLOCATING ADVERTISEMENTS

(71) Applicant: Industrial Technology Research Institute, Hsinchu (TW)

(72) Inventors: Tun-Hao You, New Taipei (TW); Yi-Jui Wu, Hsinchu (TW); Yi-Jen Yeh, Zhubei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/718,645

(22) Filed: Dec. 18, 2012

(65) Prior Publication Data
US 2013/0298159 A1 Nov. 7, 2013

(30) Foreign Application Priority Data
May 7, 2012 (TW) .............................. 101116236 A

(51) Int. Cl.
*H04H 60/32* (2008.01)
*H04N 7/10* (2006.01)
*H04N 7/173* (2011.01)
*H04N 21/478* (2011.01)
*G06Q 30/02* (2012.01)
*H04N 21/2668* (2011.01)

(52) U.S. Cl.
CPC ......... *H04N 21/478* (2013.01); *G06Q 30/0254* (2013.01); *H04N 21/2668* (2013.01)
USPC ................. 725/32; 725/13; 725/105

(58) Field of Classification Search
CPC .......... H04N 21/4722; H04N 21/4725; H04N 21/251; H04N 21/252; H04N 21/258; H04N 21/25891
USPC .............................................. 725/32, 13, 105
See application file for complete search history.

(56) References Cited

U.S. PATENT DOCUMENTS

| | | | |
|---|---|---|---|
| 6,317,881 B1 * | 11/2001 | Shah-Nazaroff et al. | ........ 725/24 |
| 6,918,131 B1 * | 7/2005 | Rautila et al. | ................... 725/34 |
| 7,548,874 B2 | 6/2009 | Kanevsky et al. | |
| 7,861,260 B2 | 12/2010 | Shkedi | |

(Continued)

FOREIGN PATENT DOCUMENTS

| TW | 200527337 | 8/2005 |
|---|---|---|
| TW | I310163 | 11/2006 |

OTHER PUBLICATIONS

Kodialam et al., "Online scheduling of targeted advertisements for IPTV", IEEE INFOCOM'10, pp. 1-9, 2010.

(Continued)

*Primary Examiner* — James R Sheleheda
(74) *Attorney, Agent, or Firm* — Rabin & Berdo, P.C.

(57) ABSTRACT

According to one exemplary embodiment of an advertisement allocating system, an image object marking and response element receives a TV program signal and then marks at least one object appearing in the TV program during a current time slot; a user element tallies all the users interested in the object, and collects all the feedback information from all the users on the TV program; based on an allowable advertisement set for the current time slot, an advertisement auto-matching element computes the correlation between each specific object and each advertisement of the allowable advertisement set, computes a score for each advertisement of the allowable advertisement set, and extracts an advertisement candidate group for broadcasting.

16 Claims, 14 Drawing Sheets

(56) References Cited

U.S. PATENT DOCUMENTS

| | | | |
|---|---|---|---|
| 7,895,076 B2 | 2/2011 | Kutaragi et al. | |
| 8,000,993 B2 | 8/2011 | Harvey et al. | |
| 2001/0023436 A1* | 9/2001 | Srinivasan et al. | 709/219 |
| 2002/0152117 A1* | 10/2002 | Cristofalo et al. | 705/14 |
| 2004/0210661 A1* | 10/2004 | Thompson | 709/228 |
| 2006/0029093 A1* | 2/2006 | Van Rossum | 370/432 |
| 2007/0078706 A1 | 4/2007 | Datta et al. | |
| 2009/0106096 A1 | 4/2009 | Horowitz | |
| 2009/0249401 A1* | 10/2009 | Squedin et al. | 725/46 |
| 2010/0057546 A1 | 3/2010 | Wang et al. | |
| 2010/0076828 A1* | 3/2010 | Neufeld et al. | 705/14.5 |
| 2010/0161424 A1 | 6/2010 | Sylvain | |
| 2010/0162414 A1 | 6/2010 | Medvinsky | |
| 2010/0218228 A1* | 8/2010 | Walter | 725/105 |
| 2011/0178871 A1* | 7/2011 | Watfa et al. | 705/14.53 |
| 2011/0181779 A1* | 7/2011 | Park et al. | 348/563 |
| 2012/0167146 A1* | 6/2012 | Incorvia | 725/60 |
| 2012/0192217 A1* | 7/2012 | Jeong et al. | 725/14 |
| 2012/0227074 A1* | 9/2012 | Hill et al. | 725/61 |
| 2012/0240163 A1* | 9/2012 | Des Jardins | 725/38 |
| 2012/0304211 A1* | 11/2012 | Berezowski et al. | 725/14 |
| 2013/0298159 A1* | 11/2013 | You et al. | 725/34 |

OTHER PUBLICATIONS

Thawani et al., "Context Aware Personalized Ad Insertion in an Interactive TV Environment", Proceedings of the AH 2004 Workshop on Personalization in Future TV, pp. 1-7, 2004.

Mei et al., "VideoSense: towards effective online video advertising", ACM Multimedia'07, Shipeng Li, pp. 1075-1084, 2007.

Diaz Redondo et al., "Bringing Content Awareness to Web-Based IDTV Advertising", IEEE Transactions on Systems, Man, and Cybernetics, Part C: Applications and Reviews, vol. 42, No. 3, pp. 1-10, May 2012.

Guo et al., :AdOn: an intelligent overlay video advertising system, ACM SIGIR'09, pp. 628-629, Jul. 2009.

Taiwan Patent Office, Office Action, Patent Application Serial No. TW101116236, Aug. 25, 2014, Taiwan.

* cited by examiner

| Object |  1122 |  1124 |  1126 |  1128 |
|---|---|---|---|---|
| Advertisement | 0 | 0.6 | 0 | 0 |
| Beer | 0 | 0 | 0.5 | 0 |
| No Drunk Driving and Safety Is Certain | 0 | 0 | 0.3 | 0.9 |
|  | 0.7 | 0 | 0 | 0 |

SYSTEM AND METHOD FOR ALLOCATING ADVERTISEMENTS

CROSS-REFERENCE TO RELATED APPLICATION

The present application is based on, and claims priority from, Application No. 101116236, filed May 7, 2012, the disclosure of which is hereby incorporated by reference herein in its entirety.

TECHNICAL FIELD

The present disclosure generally relates to a system and a method for allocating advertisements.

BACKGROUND

With the trend of digital convergence, the TV industry is learning the developing step of evolving traditional mobile phones to smart phone for migrating traditional television (TV) to the smart TV. The advertisement placement method of traditional TV is, for example, the advertiser pre-purchases the time slot of advertisement placement from TV station, or TV station allocates the time slot of advertisement placement, and determines the charged fees of advertisement placement according to the contents of the TV program rating before or after the advertisement. In general, the higher the TV program rating is the more the advertisement fee is.

For example, FIG. 1 shows a schematic view of an exemplary advertiser pre-purchasing the time slot to the TV station. As shown in FIG. 1, program_A, program_B, and program_C represent three sequential broadcasted TV contents, and the level of TV ratings for the three TV programs is described as program_A>program_B>program_C. Thus, the advertisement fees for the two advertisements AD_w, AD_x between program_A and program_B are higher than the advertisement fees for the two advertisements AD_y, AD_z between program_B and program_C.

Existing TV advertisement placement methods have no reference to user feedback related to the TV program contents for placing advertisements that may close to the user interest, but only the advertiser pre-purchases the time slot of advertisement placement, or the TV station allocates the advertisement in different time slots, and then evaluates effectiveness and charge fee of advertisement placement according to the program rating. The higher the rating is, the more the paid fee is. The increase or decrease of charge fee follows with the program rating and the good or the bad time slot. Advertiser evaluates the effectiveness of TV advertisements by taking the Cost Per Rating Point (CPRP) and the Cost Per Mille (CPM) as the indicator for TV advertisement effectiveness. The CPRP is the required cost of obtaining one percentage point of program rating. The CPM is the required cost of an advertisement delivered to 1000 people.

For an advertiser, focusing on some specific user groups or responding resources of reactive feedback of users may strengthen advertisement effectiveness of the time slot. The level of program rating is not the same as that of advertisement effectiveness, so that selecting the time slot for an advertisement according to the program rating is not an effective method. For a TV station, the aforementioned existing method may not estimate delivery scheme, order, and time slot of the advertisement for maximizing advertisement effectiveness. And users are more easily or likely to watch the advertisements that are unrelated to TV program contents or user's interests.

There are a variety of evolving directions for TV manufacturers and developers. For example, links the TV with the Internet, combines the TV with the social network, develops network services suitable for TV usage; or designs TV remote controller more suitable for user operating, creates all new user experience of interacting with TV, etc., for re-developing TV into the smart TV more suitable as the home entertainment core in the Internet age. After the popularity of the smart TV, one may rely on the smart TV to accomplish many things that the traditional TV can not achieve.

One technology determines how many people and who are the people in a particular group at a public place and recommends an appropriate advertisement according to characteristics of these people through photography and biometrics. One technology records user online behavior of using an online access device such as personal computer (PC) and then broadcasts a specific advertisement on this user's another display element, such as set-up box by referring to the user online activity of using the online access device. One technology presents different types of advertisements based on a user's pre-set characteristic value. The user may generate voting information based on the advertisement to indicate whether the advertisement is of interest. The system may update the user pre-set characteristic value based on the user's preference information to further present new suitable advertisements, which may be closer to the personalized advertisement.

Another technology performs advertisement delivery based on user's social network information and online behavior. This technology performs group classification for different users' social information and online behavior, and delivers advertisements to one or more users in the group. Therefore, the user may sort the advertisements and send the sorted advertisements to others. Yet another technology relates to a method for performing online advertisement delivery. This method categorizes advertisements, delivers advertisements to users, and collects users' feedback on the categorized advertisement (the users' feedback may contain, for example, whether there is a clicked-on, or direct turn-off, etc.), and then the users' feedback is integrated into existing standard.

Yet another technology relates to a method for intelligent dynamic marketing data collection and advertisement delivery. As shown in the flowchart of FIG. 2, the method analyzes the consumer data through collecting data and Internet Protocol (IP) addresses of consumers to determine one or more appropriate advertisements for the consumers, and transmits the appropriate information to the consumers through the IP addresses of the consumers.

One technical paper relates to online scheduling of targeted advertisements for IPTV (Internet Protocol TV) based on user interest. This technical paper provides a personalized advertisement bidding model on the IPTV, wherein the user profile and the advertisement insertion system are limited by constraints of bidding and budget, to determine the advertisement to be broadcasted according to the bidding result. Also a technical paper relates to determine the advertisement broadcasting to which user based on the user data stored in the home set-up box. The user data may contain such as user occupation, user location, and current and past user behavior. The technology also constructs context aware environments according to the user-related information, and delivers appropriate advertisements in accordance with different time slots.

There is a method called VideoSense that automatically determines to insert video advertisements according to the text appeared in the video, or the description of the video. A technology of paper recommends the personalized advertisement based on the user's interest and the TV program content. This technology collects user's personal information, and divides users into different user groups according to user's interest. An advertisement agent calculates offline the relationship between TV advertisements to be broadcasted and user groups. When the user watches TV, this technology broadcasts the advertisements that the user group is most interested in the TV program content for the users.

One technical paper discloses an intelligent video advertisement overlay system. This technology does not place the advertisement in a fixed position. As shown in FIG. 3, it identifies a significant degree by text and face identification on the video image, and performs advertisement scheduling to place suitable video at the location less affecting user's watching. Yet some techniques provide the solution for placing TV advertisements, including such as providing a web interface for the selection of advertisers, choosing the user groups of specific attributes, and so on.

Therefore, if the advertisers may establish the correlation of TV programs and advertisement contents for specific user groups, or by incorporated feedback from the user for the TV program content, dynamically determine the advertisement after the TV program, and then estimate the broadcast method, order, and time slot of the advertisement to maximize the advertisement effectiveness; then the allocating advertisement techniques on how to achieve common benefit of the advertisers and the user side, in accordance with these features, are indispensable.

SUMMARY

The exemplary embodiments of the disclosure may provide a system and method for allocating advertisements.

One exemplary embodiment relates to a system for allocating advertisements. The system may comprise an image object marking and response element configured to mark at least one object appearing in a TV program during a current time slot after receiving a TV program signal; a user element configured to tally all users interested in at least one specific object of the at least one object during the current time slot, and collects all the feedback information from the all users for the TV program during the current time slot; and an advertisement auto-matching element, based on an advertisement set allowed to be broadcasted at the current time slot, configured to compute correlation between each of the at least one specific object and each advertisement in the advertisement set, compute a score for each advertisement of the advertisement set, and extract an advertisement candidate group for broadcasting.

Another exemplary embodiment relates to a method for allocating advertisements. The method may comprise: collecting feedback information of one or more users for a TV program during a first time slot; analyzing the feedback information to construct a user feedback set, comparing an advertisement set in accordance with the user feedback set; and extracting an advertisement candidate group for broadcasting during a second time slot according to the user feedback set and a score of each advertisement in the advertisement set.

DETAILED DESCRIPTION OF DISCLOSED EMBODIMENTS

Figure 1:
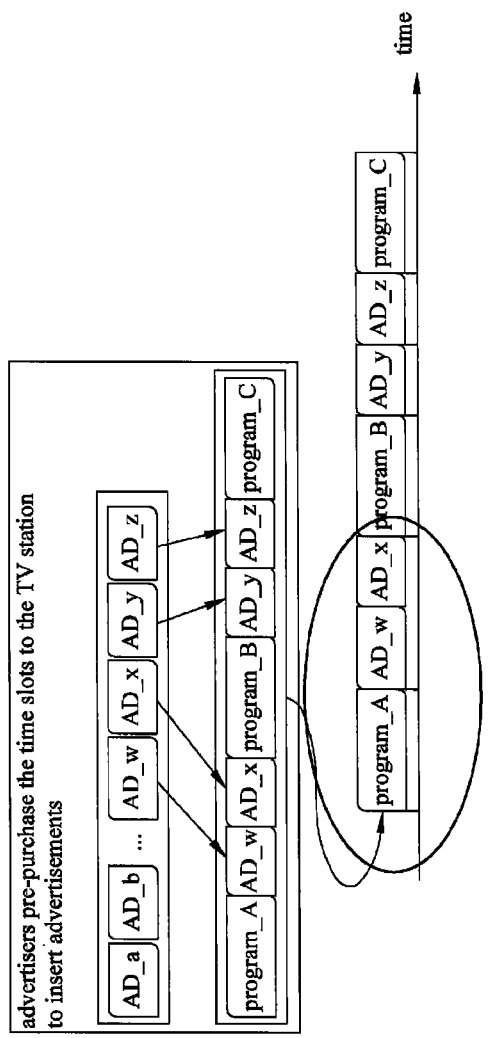
FIG. 1 shows a schematic view of an exemplary advertiser pre-purchasing the time slot to the TV station.
Figure 2:
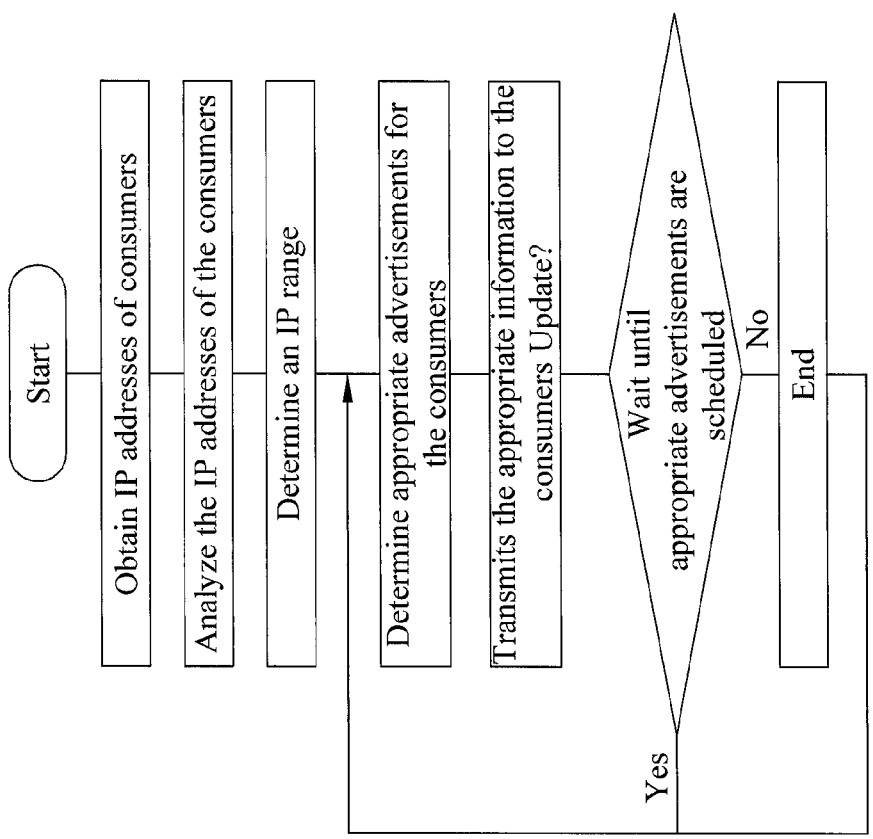
FIG. 2 shows a schematic view of a method for intelligent dynamic marketing data collection and advertisement delivery.
Figure 3:
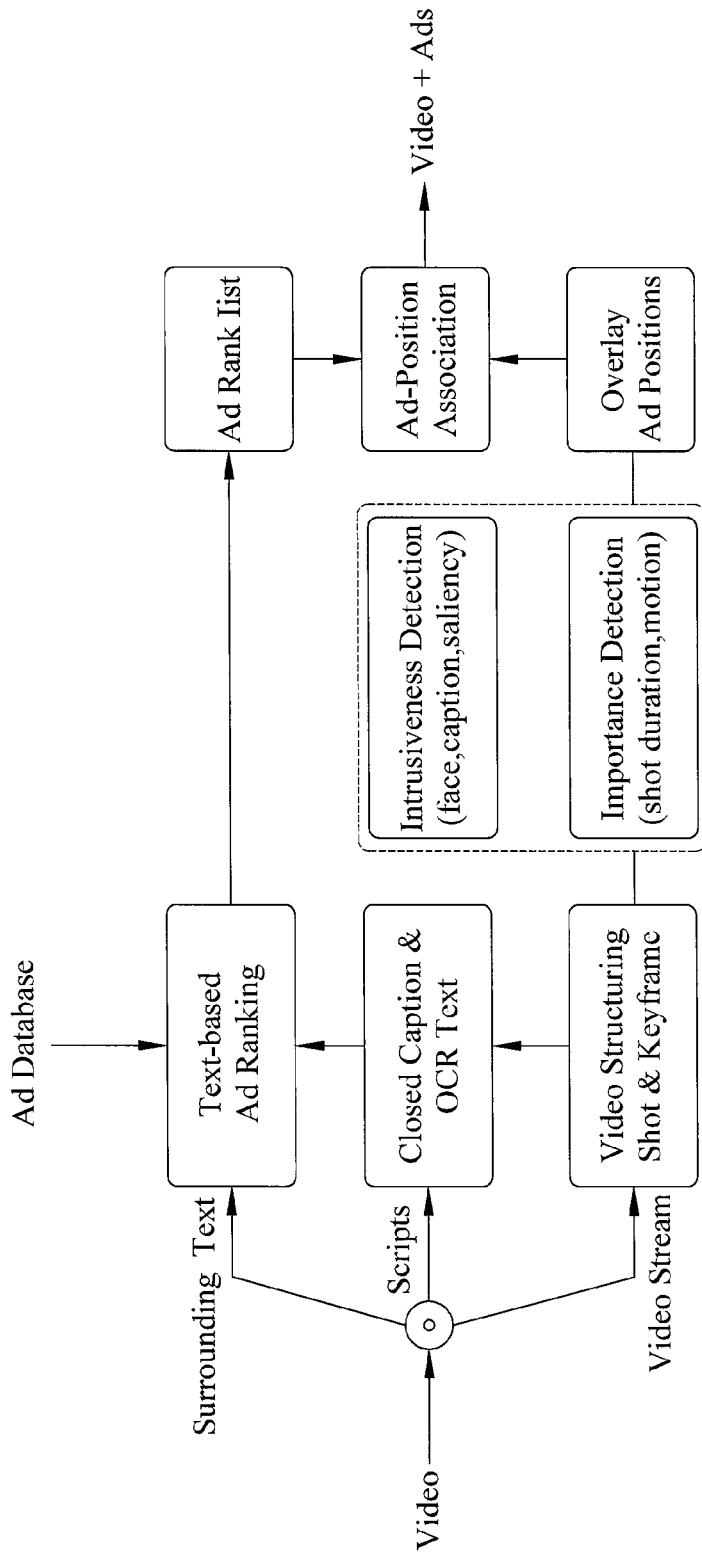
FIG. 3 shows an exemplary intelligent video advertisement overlay system.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Figure 4:
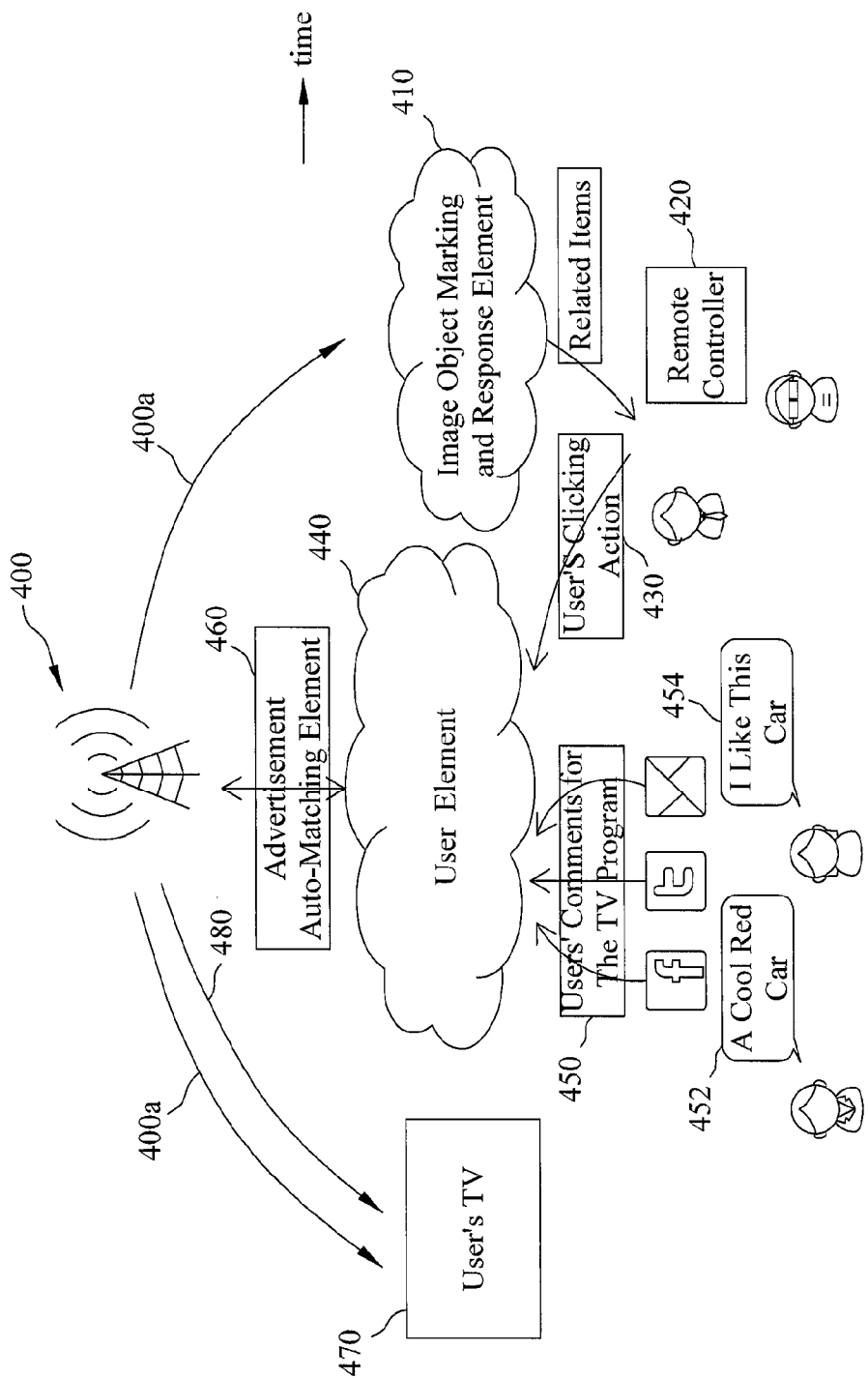
FIG. 4 shows a schematic view of an application scenario for an allocating advertisement technology on the content provider site and the user site, according to an exemplary embodiment.

The disclosed exemplary embodiment, based on the feedback from the user side for the TV contents, such as from one or more users' click/purchase behaviors on the object(s) in the TV programs, or from one or more users' website comments on the TV programs, or from one or more users' sharing videos on the social network for the TV programs, provide a dynamically determination of allocating advertisements after the TV programs. FIG. 4 shows a schematic view of an application scenario for an allocating advertisement technology on the content provider site and the user site, according to an exemplary embodiment. However, the application scenario of the allocating advertisement technology is not limited to this exemplar.

As shown in FIG. 4, a content provider side, such as channel vendor 400, sends a program signal 400a to an image object marking and response element 410 and a user's TV 470, respectively. When the user side, such as a user watching TV, is watching TV, the image object marking and response element 410 marks at least one object (for example, the red car, etc.) appearing in the TV program at a current time slot. When a user had an interest in this object, the user may view more detailed information and interact with the object in the TV program through a click element, such as a remote controller 420. A user element 440 records the user's clicking action 430, and marked the specific object of the at least one object that the user is interested in. The user interest tracking element 440 tallies all users interested in specific objects at the current time slot indicated through the image object marking and response element 410, and also instantly extracts all users' comments 450 (for example, a cool red car 452, I like this car 454, etc.) from many social networks for the TV program, and performs a user (the TV user in this case) feedback classification algorithm.

The input of the user feedback classification algorithm may include network information of discussing the TV program (for example, the comments of the TV program 450), interaction or response behavior (for example, the user click action 430) of indirect users for the specific object appearing in the TV through the image object marking and response element 410. It may further consider interests and behavioral patterns of different user groups of watching TV (for example, the TV users may be divided into different groups of middle-aged, youth, male, female, etc.) and take these information as the basis for adjusting the algorithm. After the completion of the classification for user feedback, an advertisement auto-matching element 460, based on an advertisement set at current time slot, computes the correlation between each specific object and each advertisement in the advertisement set, and computes a score for each advertisement in the advertisement set. Each advertisement is further categorized to a different user feedback classification, and an advertisement candidate group is extracted out, for example, this candidate advertisement group may be the top n advertisements that interest users, wherein n is a predetermined positive integer, so that the advertisement candidate group may be broadcasted in another advertisement's time slot 480.

Figure 5:
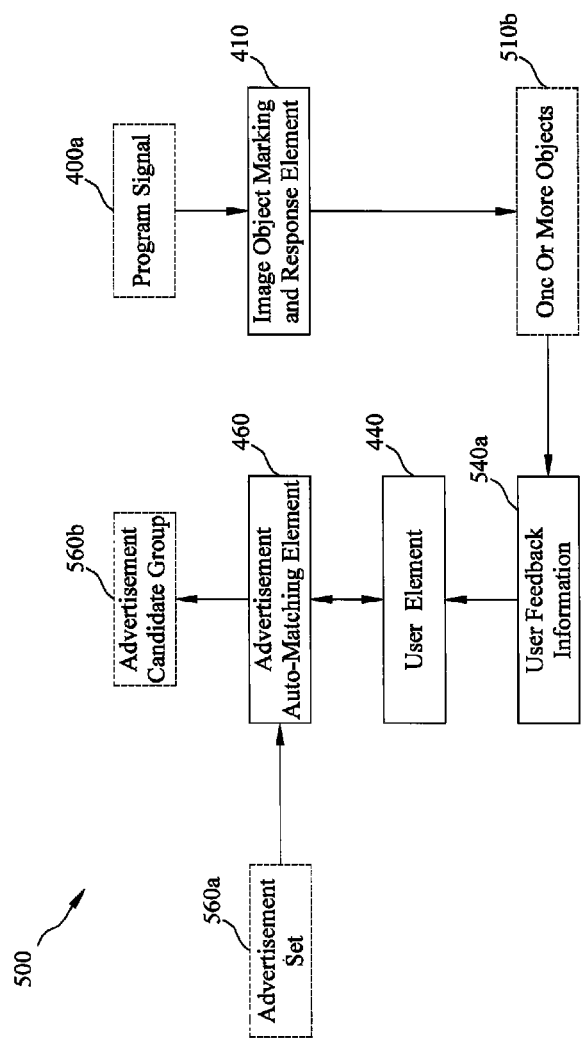
FIG. 5 shows a schematic view of an allocating advertisement system, according to an exemplary embodiment.

Accordingly, FIG. 5 shows a schematic view of an allocating advertisement system, according to an exemplary embodiment. As shown in FIG. 5, the allocating advertisement system 500 may comprise the image object marking and response element 410, the user interest tracking element 440, and an advertisement auto-matching element 460. The image object marking and response element 410 receives a program signal 400a, marks at least one object 510b appearing in the TV program at a current time slot. The user interest tracking element 440, tallies all users interested in at least one specific object of the at least one object during the current time slot, and collects all the user feedback information 540a of the TV program at the current time slot. The image object marking and response element 410 is such as an image object marking and response device or an image object marking and response system. The user interest tracking element 440, for example, is a user interest tracking device or a user interest tracking system.

The advertisement auto-matching element 460 may analyze the feedback information 440a, for example, performing object feedback frequency analysis or user interest analysis for the at least one specific object. A user feedback set may be constructed by any combination of these analyses. The advertisement auto-matching element 460 may compare the user feedback set with an advertisement set 560a broadcasted at a current time slot. The advertisement set 560a is a set formed by at least one advertisement came from advertisers or provided by third parties. The advertisement auto-matching element 460, based on the advertisement set 560a at the current time slot, computes the correlation between each specific object and each advertisement of the advertisement set 560a, computes a score for each advertisement in the advertisement set 560a, and generates an advertisement candidate group 560b for broadcasting.

Figure 6:
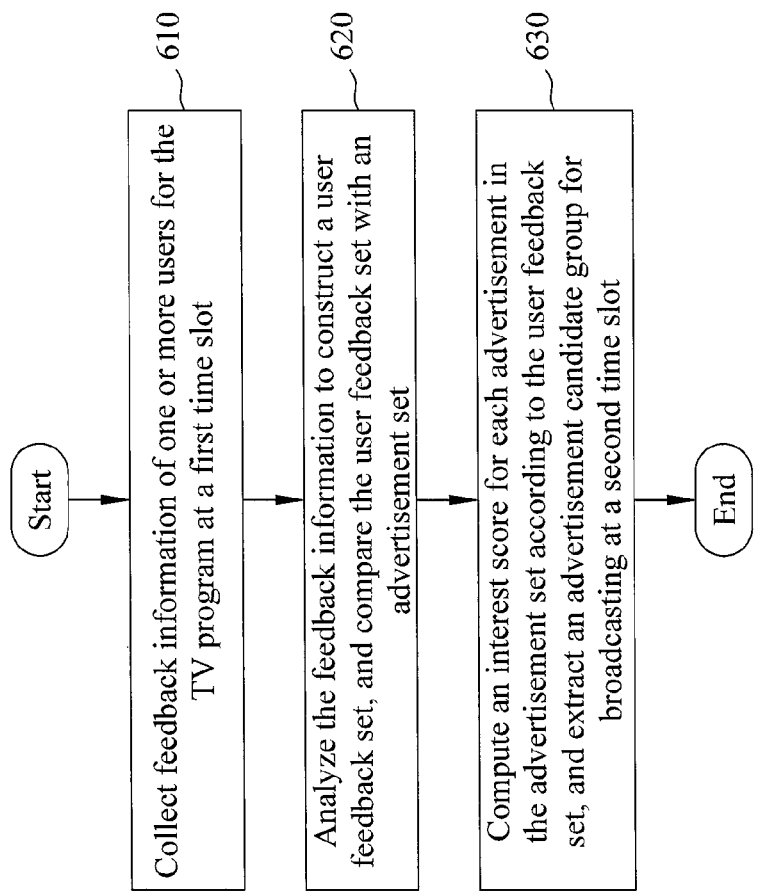
FIG. 6 shows a schematic operation of an allocating advertisement method, according to an exemplary embodiment.

With the allocating advertisement system 500, FIG. 6 shows a schematic operation of an allocating advertisement method, according to an exemplary embodiment. As shown in FIG. 6, the method collects feedback information of one or more users for the TV program at a first time slot (step 610), analyzes the feedback information, such as the aforementioned feedback frequency analysis, or user interest analysis, or viewer comments on the TV program, etc., to construct a user feedback set, and compare the user feedback set with an advertisement set (step 620). The method further computes a score for each advertisement in the advertisement set according to the user feedback set, and extracts an advertisement candidate group for broadcasting at a second time slot (step 630).

Figure 7:
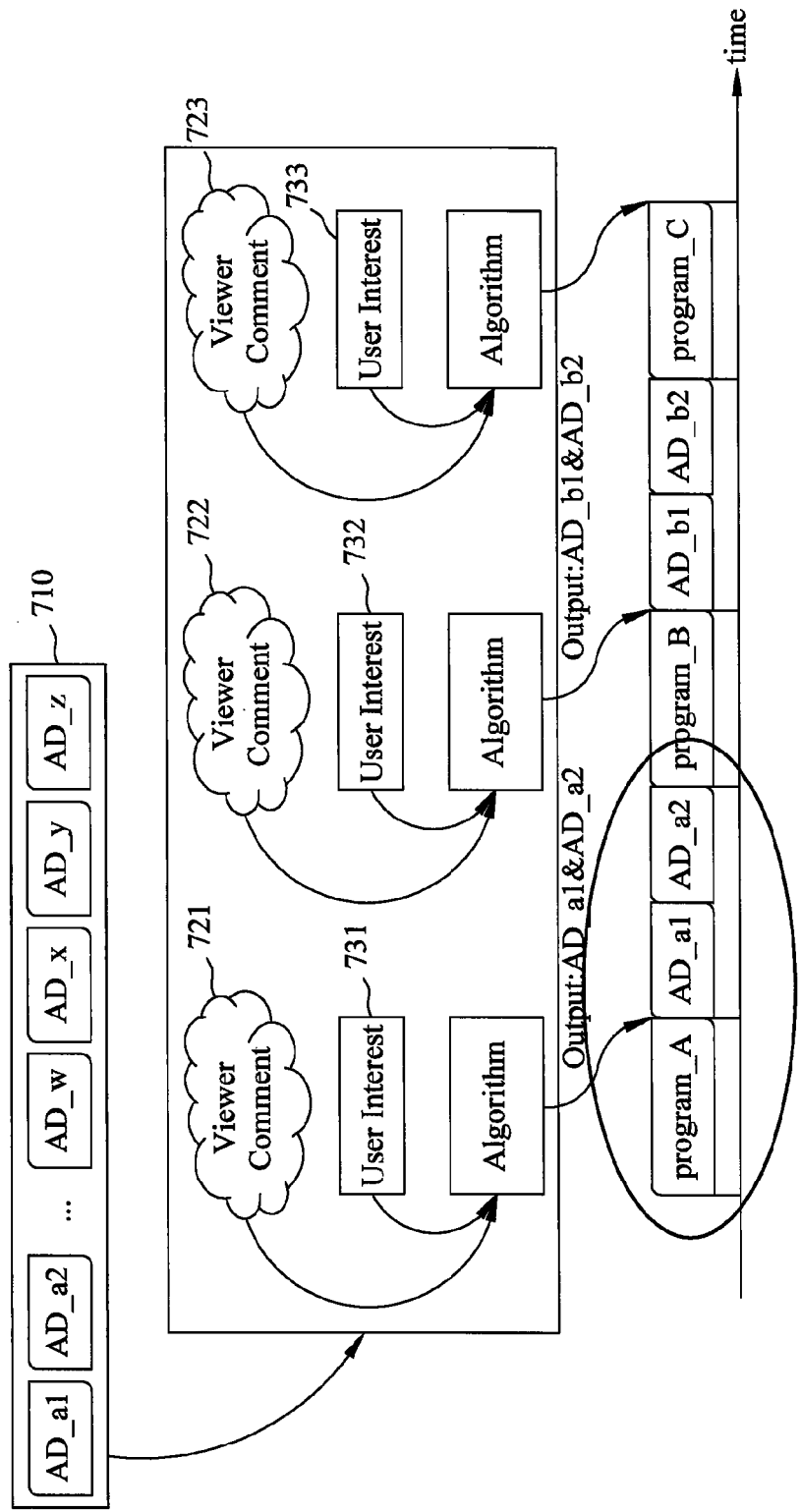
FIG. 7 shows a schematic view for channel operator, program supplier or advertiser to pre-prepare an advertisement set, and provide to channel operator to dynamically decide the time slot for broadcasting, according to exemplary embodiments.

According to the above exemplary embodiments, FIG. 7 shows a schematic view for channel operator, program supplier or advertiser to pre-prepare an advertisement set, and provide to channel operator to dynamically decide the time slot for broadcasting. Refer to FIG. 7, an advertiser may prepare an advertisement set 710, and provide to the channel vendor. In this exemplar, the advertisement set 710 includes advertisements AD_a1, AD_a2, . . . , AD_w, AD_x, AD_y, and AD_z. The channel vendor may use the technology of the disclosed allocating advertisement, collects and analyzes the feedback information of the TV program, such as viewer comments 721 to 723, user interests 731 to 733, etc., and based on the objects of higher user interest degrees in each TV program. For example, the channel vendor may determine through user feedback comments from one or more social networks, or user selections of the objects appearing in the TV program etc., and based on one or more algorithms, to select an advertisement candidate group of higher correlation with user interest from the advertisement set 710 for broadcasting after the TV program. The algorithm(s), for example, may use the classification of the K-th nearest neighbor (KNN).

For example, after analyzing feedback information, such as viewer comment 711 and user interest 721, based on an algorithm, the channel vendor may select advertisements AD_a1 and AD_a2 from the advertisement set 710 for broadcasting after the TV program_A. Similarly, after analyzing feedback information, such as viewer comment 712 and user interest 722, based on an algorithm, the channel vendor may select advertisement AD_b1 and AD_b2 from the advertisement set 710 for broadcasting after the TV program_B.

In the above exemplary embodiments, each advertisement in the advertisement set may further include at least one advertisement description attribute. The at least one advertisement description attribute is such as label attribute, type characteristic attribute, or advertisement broadcast region-wide attribute, etc. The user feedback information or the user feedback set for the TV program at the current time slot may be chosen from one or both of interactive feedback information and comment feedback information of at least one user for the TV program at a sampled time slot before broadcasting the advertisement candidate group. The feedback information may be accumulated more than one times during the sampled time slot. The interactive feedback information is the operation behavior of at least one user through at least one electrical machine, such as TV, remote control, computers, mobile devices, hand gesture input devices, and other input devices, with the object information embedded in TV program content, defined by user, or provided by another system for the at least one object appearing in the TV program when the at least one user watches the TV program at the current time slot. The comment feedback information may be, for example, the information related to the TV program, such as text information, audio information, image information, audio and video information, and picture information, published by at least one user in at least one web site accessible by other users.

Figure 8:
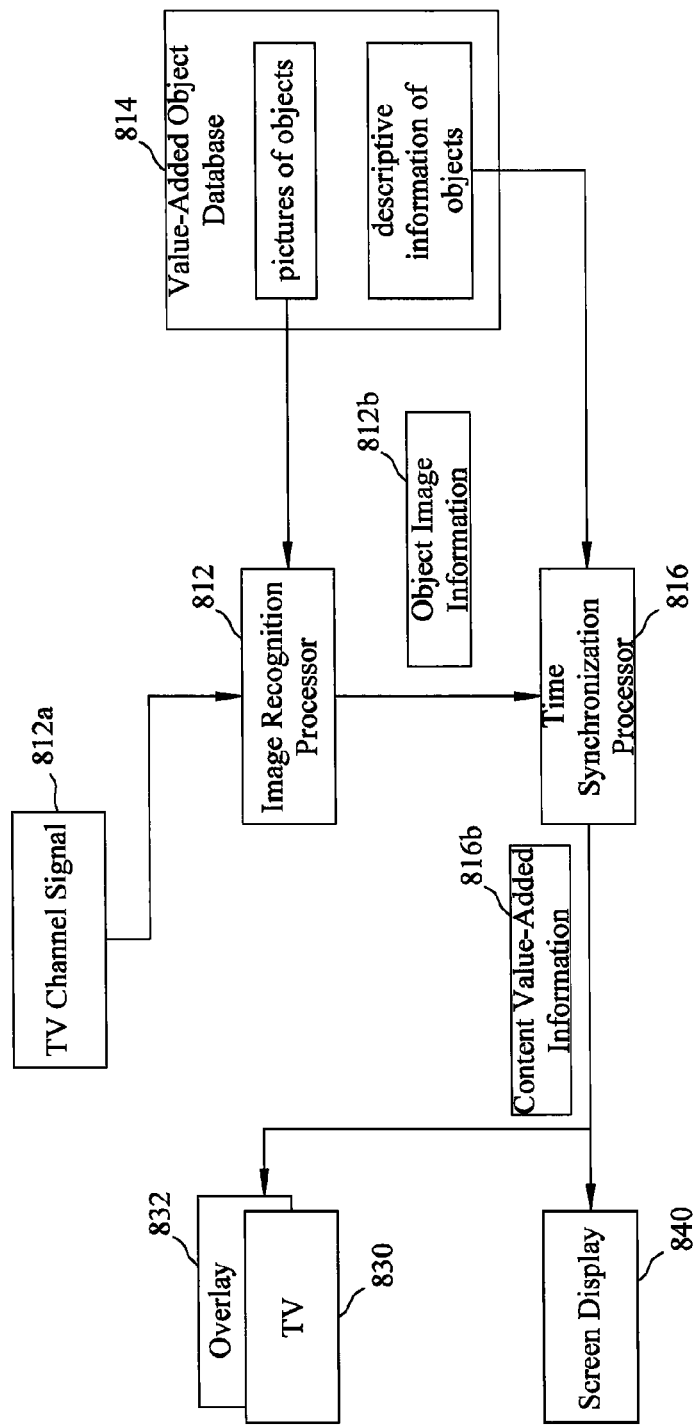
FIG. 8 shows an internal structure and the operation of the image object marking and response element, according to an exemplary embodiment.

The image object marking and response element 410 may be a cloud server. FIG. 8 shows an internal structure and the operation of the image object marking and response element, according to an exemplary embodiment. As shown in FIG. 8, the image object marking and response element may include an image recognition processor 812, a value-added object database 814, and a time synchronization processor 816. The value-added object database 814 stores the images of different objects and their corresponding descriptive information, for example, actor photo and actor introduction, product images and product information, etc. These information and images are, for example, from advertisers or provided by third parties.

In the image object marking and response element 410, the image recognition processor 812 receives such as a TV channel signal 812*a* provided by a channel vendor, and identifies time and location of images appearing in the TV screen of the user side according to the images of the objects stored in the value-added object database 814. The time synchronization processor 816 gathers the identified object image information 812*b* and the descriptive information corresponding to the objects stored in the value-added object database 814 into the content value-added information 816*b*, and delivers the content value-added information to at least one TV 830 of the user side or a screen display 840 of a remote controller. The content value-added information 816*b* may be one or more information chosen from a group consisting of such as location information of at least one object to be marked, format information of the user interface to be presented, time information of the at least one object to be marked, and other relevant information. The time synchronization processor 816 let the TV 830 of the user side, according to the time and the location of the object in the content value-added information 816*b*, correspond to the TV screen of the same time and the location that the object appears in the TV screen. In other words, the overlay 832 in the TV screen marks the identified object and descriptive information of the object. The content value-added information 816*b* may also be sent to the screen display 840, and presents descriptive information of the object in the content value-added information 816*b* on a corresponding interface.

Figure 9:
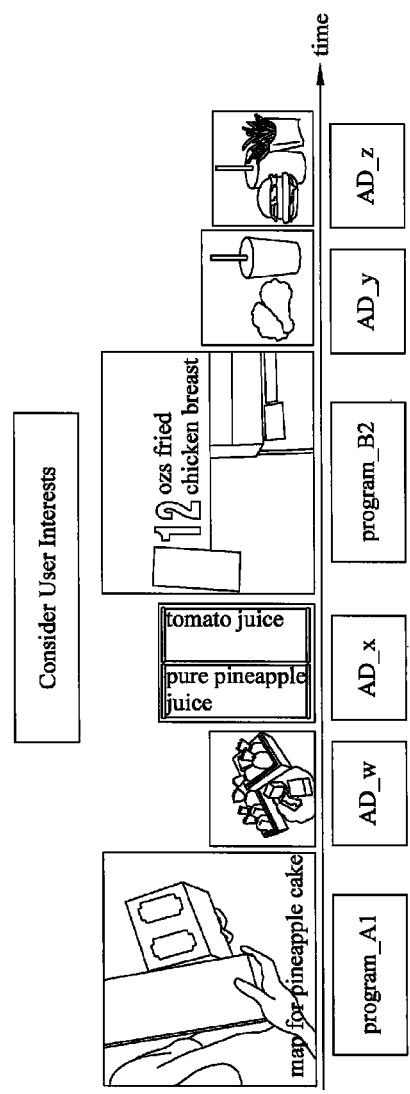
FIG. 9 shows a schematic view for arranging the order and time slots of advertisements by considering user feedback on the TV program content, according to an exemplary embodiment.

FIG. 9 shows a schematic view for arranging the order and time slots of advertisements by considering user feedback on the TV program content, according to an exemplary embodiment, wherein assumed that the rating of program A of introducing pineapple cake is higher than program B of introducing fried chicken breast. The exemplary embodiments of the disclosure collect user feedback for the content of TV programs at each time slot after each of the TV programs, and real-time analyze the feedback information to find out user interests for different objects appearing on the TV screen. For example, a user may select purchasing the pineapple cake or views its detailed information on the smart TV or the remote controller through the image object marking and response system, which may be viewed as the user has a strong interest on the pineapple cake at the time slot's TV program; and may instantly capture all user comments for the TV program from many social networks to find out the object that users are more interested in or more frequently discussed on.

Based on the above information, the disclosed exemplary embodiments adjust the advertisement placement order to refer to the user interest for the TV programs, so that each advertisement is able to attract more users interested in the advertisement. When the current user interest of viewing program B is fried chicken and fast food, even the rating of program B is lower than of program A, but the fast food supplier places the advertisement at time slots AD_y and AD_z, which may attract the attention of more users than places advertisement at the time slot AD_w and AD_x. Also, when the current user interest of viewing program A is pineapple cake and fruit, the advertisement related to fruit juice and fruit cakes is placed at the time slot AD_w, AD_x may attract the attention of more users. Therefore, compared to traditional advertisement techniques, the disclosed exemplary embodiments may achieve more accurate marketing strategies.

Figure 10:
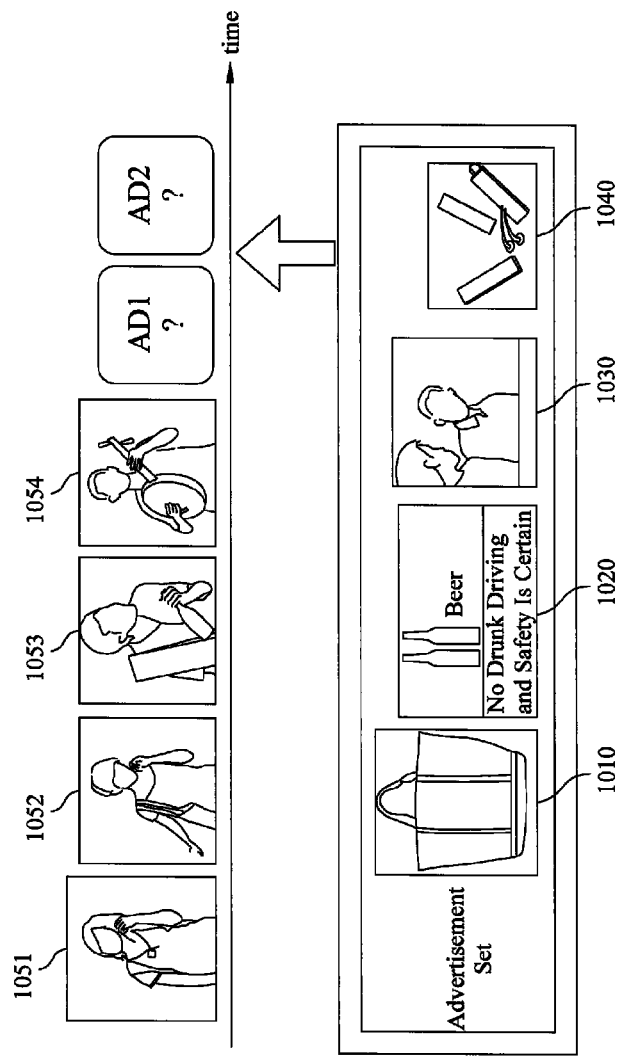
FIG. 10 shows a schematic architecture of dynamically deciding the advertisement based on user feedback behavior, according to another exemplary embodiment.

FIGS. 10-13 illustrate another exemplar for deciding advertisements to be broadcasted, based on user clicking interested objects on a smart TV screen, according to an exemplary embodiment. The exemplar is considered as exemplary only, and a true scope of the disclosure is not limited to the exemplar. FIG. 10 shows a schematic architecture of dynamically deciding the advertisement based on user feedback behavior, according to another exemplary embodiment. As shown in FIG. 10, the broadcasting content of the TV program is a movie. At the end of broadcasting of this movie, the allocating advertisement system of the exemplary embodiments refers to the operation behavior of the user for the object appearing in the movie on the smart TV screen, selects two advertisements that users are most interested from an advertisement set, and places at time slots AD1 and AD2 for broadcasting. The advertisement set may include, for example, a brand-name leather advertisement 1010, a beer advertisement 1020, an actor endorsement advertisement 1030, an import MP3 player advertisement 1040, etc.

The aforementioned feedback frequency analysis may include calculating the operation score for each object of at least one object appearing in the TV program such as the image frames 1051 to 1054 (i.e. partial content of the TV program), based on the operation behavior of the user feedback set for the TV program; calculating a correlation score between each object and each advertisement by comparing the relationship between each object in the TV program and the description attribute of each advertisement in the advertisement set; computing a score of each advertisement based on the operation score of each object and the correlation score between each object of the at least one object. For example, the interest score of each advertisement may be computed by accumulating each product of the operation score of each object in the TV program and the correlation score of the object.

Figure 11:
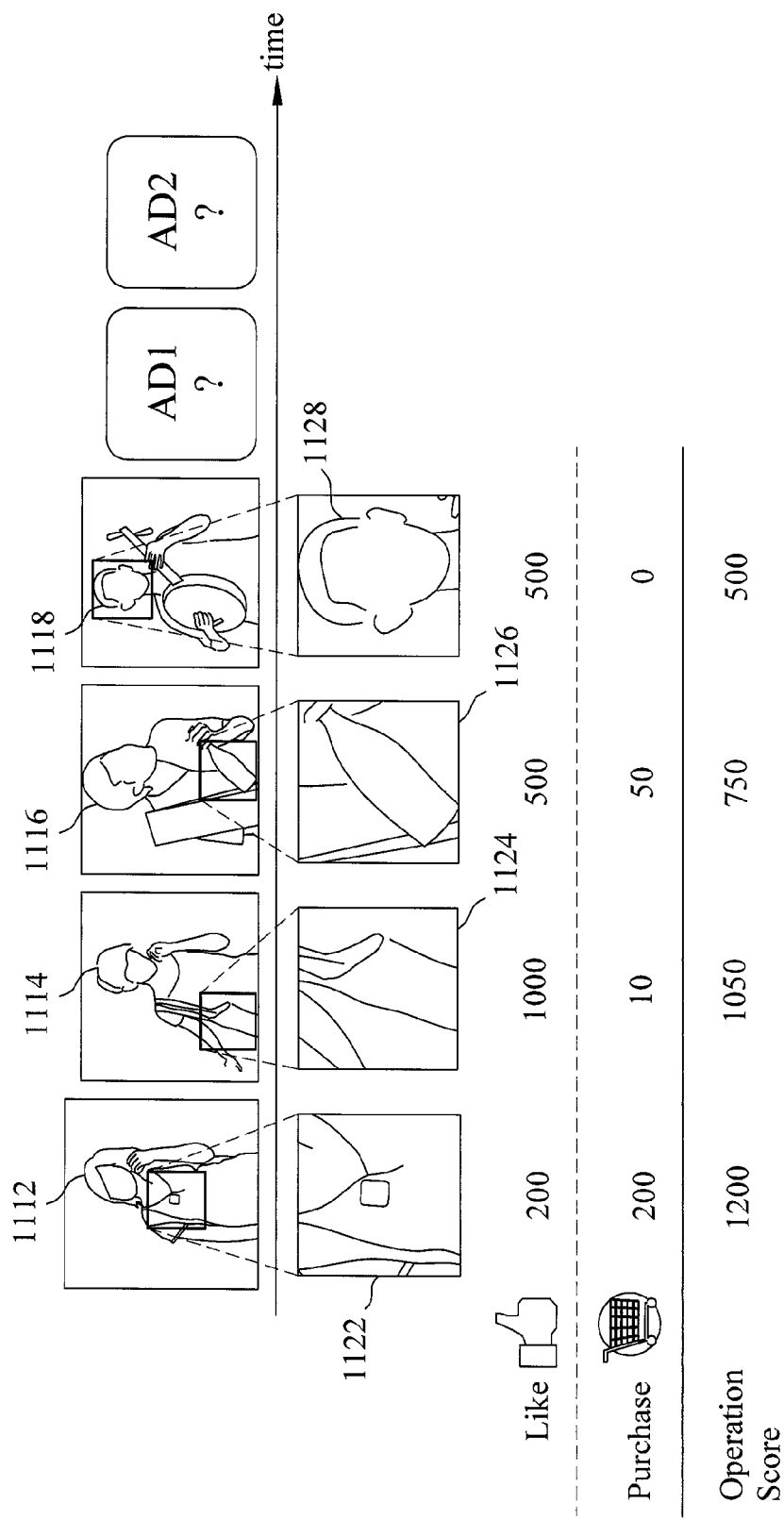
FIG. 11 shows a schematic view illustrating how the allocating advertisement method calculates an operation score of an object for a user, according to an exemplary embodiment.

FIG. 11 shows a schematic view illustrating how the allocating advertisement method calculates an operation score of an object for a user, according to an exemplary embodiment. As shown in FIG. 11, the image object marking and response element 410 may provide four objects in the movie for the user clicking an operation mode such as a "like" or a "purchase" click. The four objects may include such as a domestic MP3 player 1122 on actor 1112, a bag 1124 on actor 1114, a rice wine 1126 on actor 1116, and a stage photo 1128 of actor 1118. Before the advertisement time slot AD1, there are 200 "like" clicks for domestic MP3 player 1122 of actor 1112, 1000 "like" clicks for bag 1124 of actor 1114, 500 "like" clicks for rice wine 1126 of actor 1116, and 500 "like" clicks for playing gesture 1128 of actor 1118; and 200 "purchase" clicks for domestic MP3 player 1122 of actor 1112, 10 "purchase" clicks for bag 1124 of actor 1114, and 50 "purchase" clicks for rice wine 1126 of actor 1116, respectively.

In the exemplar of FIG. 11, it may define the weight for "like" click is 1, the weight for "purchase" click is 5, and the operation score of each object is the sum after weighted by "like" and "purchase", according to an exemplary embodiment. Therefore, the operation score of each object may be calculated as follows:

the operation score for domestic MP3 player 1122 of actor 1112=200×1+200×5=1200;

the operation score for bag 1124 of actor 1114=1000× 1+10×5=050;

the operation score for rice wine 1126 of actor 1116=500×1+50×5=750; and the operation score for stage photo 1128 of actor 1118=500×1+0×5=500.

Figure 12:
FIG. 12 shows an exemplar illustrating how the allocating advertisement method calculates a correlation score between each advertisement and each object, according to an exemplary embodiment.
Figure 12:
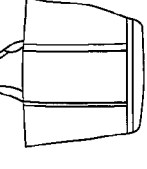
Figure 12:
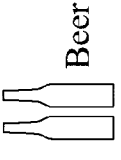
Figure 12:
Figure 12:
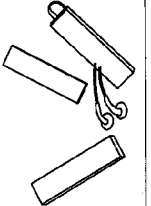

FIG. 12 shows an exemplar illustrating how the allocating advertisement method calculates a correlation score between each advertisement and each object, according to an exemplary embodiment. As shown in FIG. 12, the correlation score between each advertisement in the advertisement set and each object may be performed by utilizing the well-known semantic classification, such as the semantic classification of K-th Nearest Neighbor (KNN), which firstly finds different semantic features to define different semantic distances, and finds the closest K values as the highest K values of correlation score; or firstly finds different semantic features to calculate the vector dimension between the object of user interested and the advertisement. When the angle between two vectors is 0 degree, it is considered as fully related. When the angle is 90 degrees, it is considered as unrelated. When the angle is 180 degrees, it is considered as negative correlation.

In the exemplar of FIG. 12, the correlation score obtained through the algorithm may be normalized as a value from 0 to 1, wherein 1 represents related, 0 represented unrelated. Thus, the calculation result for the correlation score of each advertisement and four objects (domestic MP3 player 1122 of actor 1112. bag 1124 of actor 1114, rice wine 1126 of actor 1116, and stage photo 1128 of actor 1118) may be shown by a vector as follows. The correlation score of brand-name leather goods advertisement 1010 and each object is (0,0.6, 0,0); the correlation score of beer advertisements 1020 and each object is (0,0,0.5,0); the correlation score of actor endorsement advertisement 1030 and each object is (0,0,0.3, 0.9); and the correlation score of import MP3 player advertisement 1040 and each object is (0.7,0,0,0).

Figure 13:
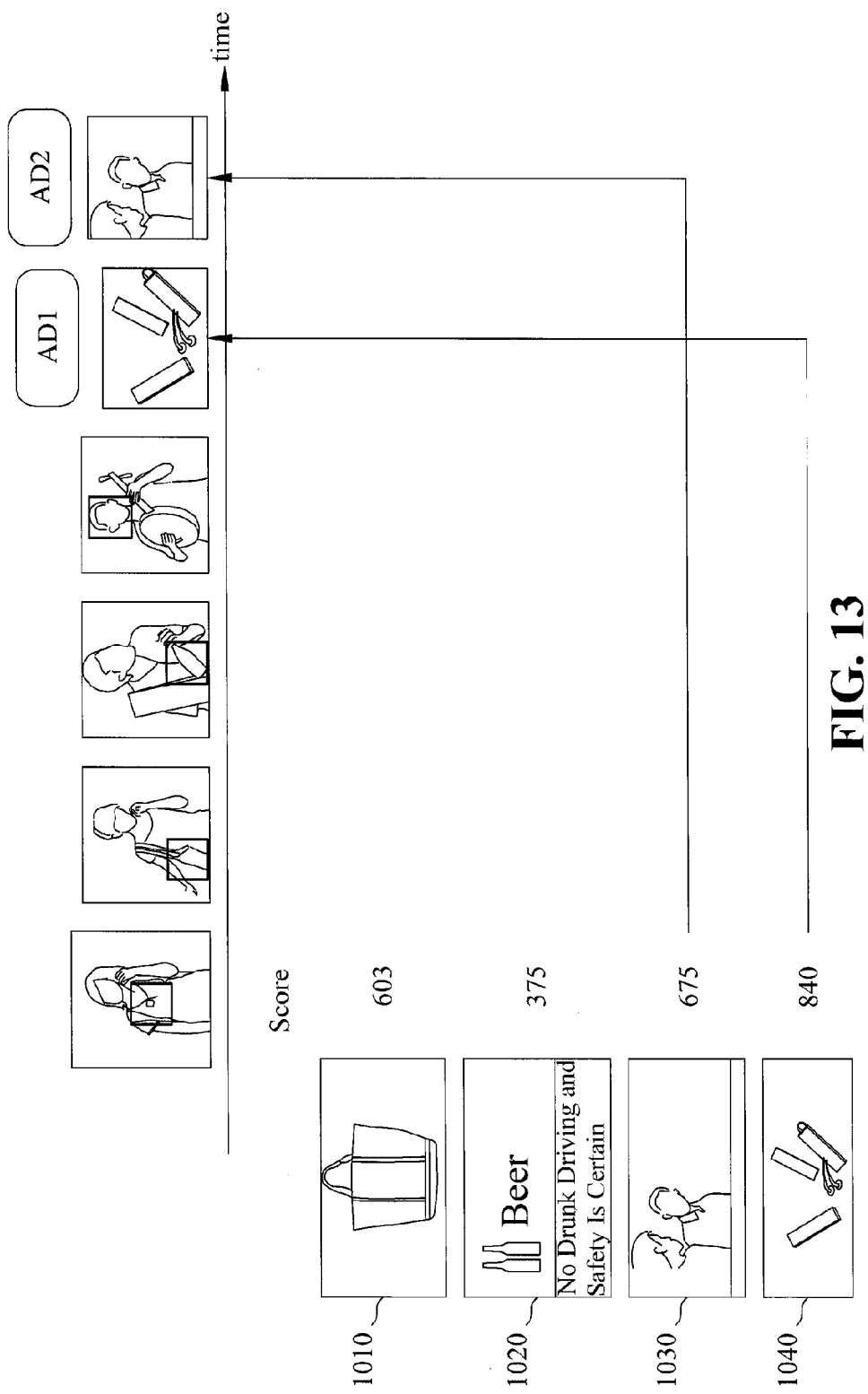
FIG. 13 shows an exemplar illustrating how the allocating advertisement method calculates a score of each advertisement and places the advertisements, according to an exemplary embodiment.

FIG. 13 shows an exemplar illustrating how the allocating advertisement method calculates a score of each advertisement and places the advertisements, according to an exemplary embodiment. As shown in the exemplar of FIG. 13, the disclosed exemplary allocating advertisement system defines interest scores for an advertisement as an accumulated product of the correlation score between the advertisement and each object and the operation score of the object. Therefore, the calculation result of the interest score for each advertisement is as follows. The interest score for brand-name leather goods=0×1200+0.6×1050+0×750+0×500=603. Similarly, interest scores of other advertisement scores are interest score 375 for beer advertisement 1020, interest score 675 for actor endorsement advertisement 1030, and interest score 840 for import MP3 player advertisement 1040, respectively. Accordingly, the disclosed exemplary allocating advertisement system may extract for example, the highest interest score of the import MP3 player advertisement for broadcasting at the time slot AD1, the second highest interest score of actor endorsement advertisement for broadcasting at the time slot AD2.

The aforementioned user interest analysis may include computing at least one concern message and its weighted score of at least one user at a sampled time slot, or a system manager defines the concern message and its weighted score of at least one user at the sampled time slot; comparing each concern message with at least one advertisement description attribute of each advertisement in the advertisement set, and computing the correlation of each advertisement and each concern message; and computing the interest score of each advertisement according to the operation score of each object of the at least one object and the correlation score between each object. The followings give examples for illustration.

Figure 14:
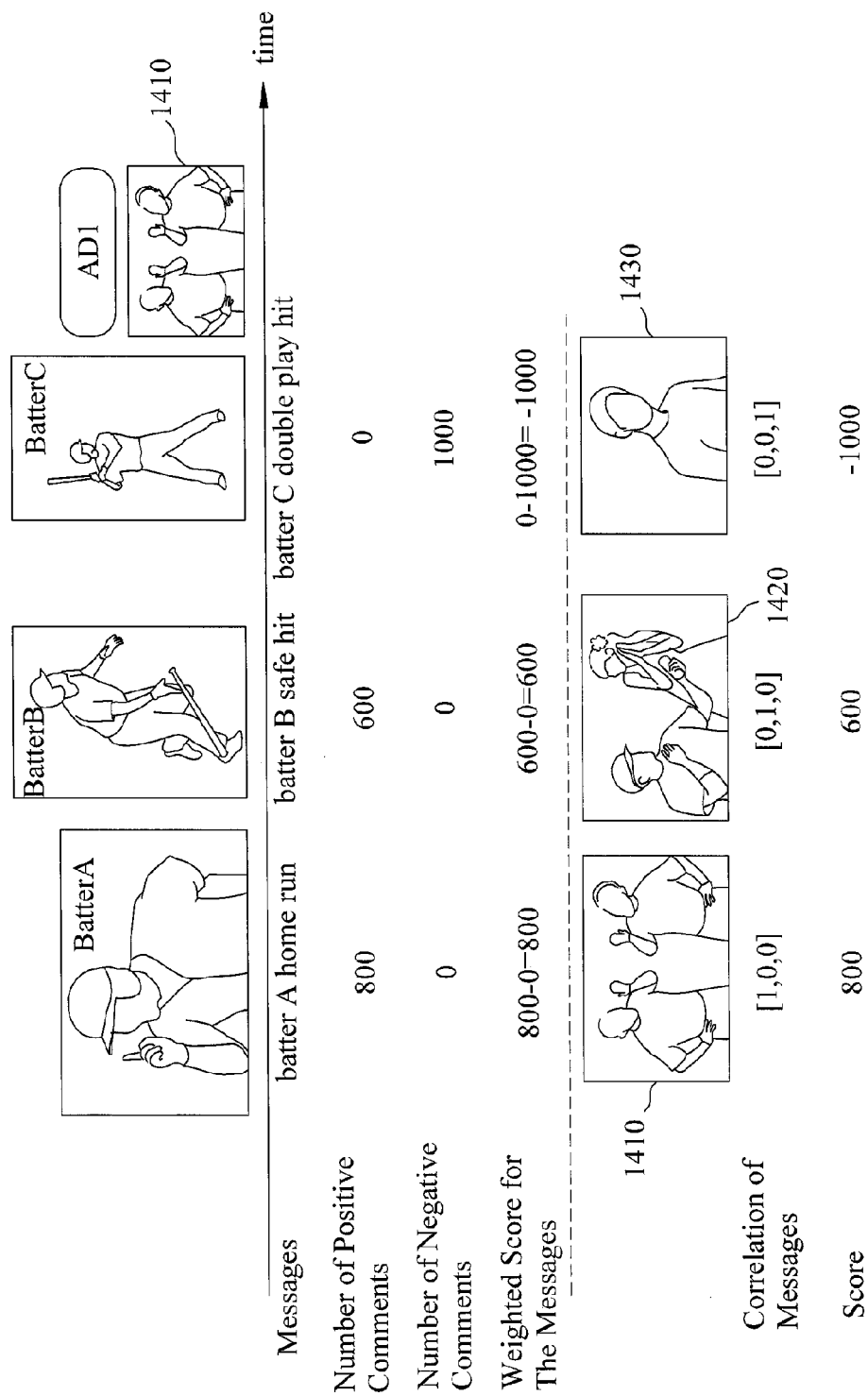
FIG. 14 shows an exemplar illustrating how to dynamically select advertisements for broadcasting by considering users' messages for a TV program, according to an exemplary embodiment.

FIG. 14 shows an exemplar illustrating how to dynamically select advertisements for broadcasting by considering users' messages for a TV program, according to an exemplary embodiment. In the exemplar of FIG. 14, the TV program is playing a baseball game of a Chinese team, and a bunch of forum is a lively discussion of the game on the network. There are lots of advertisements in the advertisement set, wherein three advertisements are endorsement advertisements of three batters in this inning. At this moment, batter A hits a home run for the first score of the Taiwan team, and batter B hits a safe hit, batter C hits a double play hit and stops the offensive of the Taiwan team.

The disclosed exemplary allocating advertisement system captures user comments of the TV program on the Internet in real time, and performs semantic analysis and determination on the user comments. As shown in FIG. 14, 800 users give positive comment to batter A with home run, 600 users give positive comment to batter B with a safe hit, and 1000 users give negative comment to batter C with double play hit. In other words, messages are batter A home run, batter B safe hit, and batter C double play hit, respectively. The numbers of positive comments of the three messages are 800, 600, and 0, respectively, while numbers of negative comments of the three messages are 0, 0, and 1000, respectively. Therefore, weighted score for the three messages are 800−0, 600−0, and 0−1000, i.e., 800, 600, and −1000, respectively, and the correlation of the three messages are [1, 0, 0], [0, 1, 0], and [0, 0, 1], respectively. Therefore, interest scores for endorsement advertisement of batter A, batters B, and batter C are 800×1+ 600×0+(−1000)×0, 800×0+600×1+(−1000)×0, and 800×0+ 600×0+(−1000)×1, i.e., 800, 600, and −1000, respectively.

Therefore, the disclosed exemplary allocating advertisement system may place the endorsement advertisement 1410 of batter A and the endorsement advertisement 1420 of batter B after the TV program. The endorsement advertisement 1430 of batter C is not appeared at the time slot of broadcasting the advertisements.

The disclosed exemplary embodiments may have a variety of strategies for broadcasting the advertisement candidate group. For example, those advertisements that have interest scores higher than a first threshold are the advertisements to be broadcasted at an advertised time slot; or those advertisements that have interest scores higher than a second threshold may be broadcasted at least twice at an advertised time slot. Interest score may be used to determine the broadcast order of the advertisement group candidate at the advertised time slot. For example, it may firstly broadcast the advertisement with the highest interest score, and sequentially broadcast the advertisement with the second highest interest score, broadcast advertisement with the third highest interest score, . . .

and broadcast the advertisement with the lowest interest score. If the cumulative time for broadcasting the advertisement candidate group is less than a full advertised time slot, then it may use the traditional method to select one or more advertisements to fill full the advertised time slot.

In summary of the disclosure, the above exemplary embodiments may provide a system and method for allocating advertisements, which dynamically determines broadcasting advertisements at advertised time slot according to user feedback for a TV program. Wherein, the image object marking and response element receives a TV program signal and marks at least one object appearing in the TV program at a current time slot; the user interest tracking element tallies all users interested in at least one specific object of the at least one object, and collects all the feedback information from the all users for the TV program; the advertisement auto-matching element, based on an advertisement set allowed to be broadcasted at the current time slot, computes correlation between each specific object and each advertisement in the advertisement set, computes a score for each advertisement of the advertisement set, and extracts an advertisement candidate group and decides a broadcasting order according to the interest score.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A system for allocating advertisements, comprising:
    an image object marking and response element configured to mark at least one object appearing in a television (TV) program during a current time slot after receiving a TV program signal;
    a user element that executes on a processor to tally all users interested in at least one specific object of said at least one object during said current time slot, and collect all feedback information from said all users for said TV program during said current time slot; and
    an advertisement auto-matching element, based on an advertisement set allowed to be broadcasted during the current time slot, that executes on a processor to compute correlation between each of the at least one specific object and each advertisement in said advertisement set, compute a score for each advertisement of said advertisement set, and extract an advertisement candidate group for broadcasting;
    wherein said feedback information includes a combination of one or more than one information of feedback frequency analysis, user interest analysis, and viewer comment of said TV program; and
    wherein the feedback frequency analysis includes calculating an operation score of the at least one specific object based on an operation behavior of user feedback, calculating a correlation score between the at least one specific object and at least one advertisement of said advertisement set by comparing a relationship between the at least one object and a description attribute of the at least one advertisement and assigning a numerical value within a normalized scale to the relationship, and computing a score of the at least one advertisement based on the operation score and the correlation score.

2. The system as claimed in claim 1, wherein each advertisement of said advertisement set further includes at least one advertisement description attribute, and said at least one advertisement description attribute is chosen from a group consisting of one or more attributes of label attribute, type characteristic attribute, and advertisement delivery region-wide attribute.

3. The system as claimed in claim 1, wherein said feedback information further includes a combination of one or both of more than one interactive feedback information and comment feedback information of at least one user for said TV program in a sampled time slot before broadcasting of said advertisement candidate group.

4. The system as claimed in claim 3, wherein said comment feedback information is a combination of one or more information published in at least one web site of text information, audio information, image information, audio and video information, and picture information related to said TV program.

5. The system as claimed in claim 3, wherein said interactive feedback information is at least one operation behavior performed by said at least one user through at least one electrical device and via object information, for said at least one object appearing in said TV program when said at least one user watches said TV program at said current time slot.

6. The system as claimed in claim 5, wherein said at least one electrical device is one or more electrical devices of TV, remote controller, computer, mobile device, and input device.

7. The system as claimed in claim 5, wherein said object information is embedded in said TV program.

8. The system as claimed in claim 5, wherein said object information is defined by users or provided by another system.

9. The system as claimed in claim 1, wherein said image object marking and response element further includes:
    a value-added object database that stores a plurality of pictures of different objects and their corresponding descriptive information; and
    an image recognition processor that receives said TV signal, and identify time and location of said plurality of pictures appearing on at least one TV screen of a user side according to said plurality of pictures of different objects stored in said value-added object database.

10. The system as claimed in claim 9, said system gathers picture information of at least one identified object and said corresponding descriptive information stored in said value-added database into content value-added information, and delivers said content value-added information to at least one TV or a screen display of said user side.

11. The system as claimed in claim 10, wherein said value-added information includes a combination of one or more information of location information of object to be marked, format information of a user interface to be rendered, time information of said at least one object to be marked, and related information.

12. The system of claim 1, wherein an advertisement is dynamically selected for broadcast based on a vector of a count of user messages classified as negative or positive.

13. A method for allocating advertisements, comprising:
    collecting feedback information of one or more users for a television (TV) program at a first time slot;
    analyzing said feedback information to construct a user feedback set, comparing an advertisement set in accordance with said user feedback set; and
    extracting an advertisement candidate group for broadcasting during a second time slot according to said user feedback set and an interest score of each advertisement in said advertisement set;
    wherein said feedback information includes a combination of one or more than one information of feedback frequency analysis, user interest analysis, and viewer comment of said TV program; and wherein said feedback frequency analysis includes:
calculating an operation score of each object of at least one object appearing in said TV program according to operation behavior for said TV program in said user feedback set; and
comparing a relationship between said each object of at least one object with at least one advertisement description attribute of each advertisement in said advertisement set, and calculating a correlation score of said each object of at least one object and said each advertisement in said advertisement set by comparing a relationship between said each object of at least one object and said at least one advertisement description attribute of said each advertisement in said advertisement set and assigning a numerical value within a normalized scale to the relationship, and computing the interest score of each advertisement in said advertisement set based on the operation score and the correlation score.

14. The method as claimed in claim 13, wherein said user interest analysis further includes:

computing at least one concern message and its weighted score of at least one user at a sampled time slot;
comparing each concern message of said at least one concern message with advertisement description attribute of each advertisement in said advertisement set, and computing correlation of said each advertisement and said each concern message; and
computing said interest score of said each advertisement by accumulating a product of said weighted score of said each concern message and said correlation of said each concern message.

15. The method as claimed in claim 13, wherein said interest score of each advertisement in said advertisement set is used to determine a broadcast order of said advertisement candidate group at said second time slot.

16. The method as claimed in claim 13, wherein any advertisement in said advertisement set with said interest score higher than a first threshold is an advertisement to be broadcasted at said second time slot.

* * * * *